(12) United States Patent
Aono et al.

(10) Patent No.: US 6,920,863 B1
(45) Date of Patent: Jul. 26, 2005

(54) INTAKE-AIR MEASURING APPARATUS FOR INTERNAL COMBUSTION ENGINE

(75) Inventors: Toshihiro Aono, Abiko (JP); Mamoru Nemoto, Hitachiota (JP); Kozo Katogi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/911,658

(22) Filed: Aug. 5, 2004

(30) Foreign Application Priority Data

Jan. 8, 2004 (JP) .................................... 2004-003198

(51) Int. Cl.$^7$ .............................................. F02D 75/02
(52) U.S. Cl. ................................ 123/319; 73/118.2
(58) Field of Search .................... 123/319; 73/118.2, 73/117.3; 701/101

(56) References Cited

U.S. PATENT DOCUMENTS 5,889,205 A * 3/1999 Treinies et al. ............ 73/118.2
5,974,870 A * 11/1999 Treinies et al. ............ 73/118.2
6,741,924 B2 * 5/2004 Iwasaki et al. ............. 701/114

FOREIGN PATENT DOCUMENTS

JP 301144 11/1995

* cited by examiner

Primary Examiner—Mahmoud Gimie
(74) Attorney, Agent, or Firm—Antonelli, Terry, Stout & Kraus, LLP

(57) ABSTRACT

An intake-air measuring apparatus for an internal combustion engine, enabling to calculate a mass of intake-air inducted into the internal combustion engine, with a small map but at high accuracy, comprises: a means for measuring out an air mass passing through a throttle valve based on pressure in up/down streams of the throttle valve and temperature in the upstream of the throttle valve; a means for calculating an air mass passing through the intake valve based on a rotation speed of the internal combustion engine, an open/close timing of the intake valve and an opening of an EGR valve; and a means for selecting either one of the air mass passing through the throttle valve or the air mass passing through the intake valve, depending upon operation condition of the internal combustion engine, thereby outputting the selected air mass as inducted air mass into the internal combustion engine.

16 Claims, 10 Drawing Sheets

ROTATION SPEED OF INTERNAL COMBUSTION ENGINE AND OPENING OF EGR VALUE ARE CONSTANT $$f(\theta, P_1, P_2, T_1) = (1-\cos\theta)\,\frac{P_1}{\sqrt{T_1}}\sqrt{\left(\frac{P_2}{P_1}\right)^{\frac{2}{k}} - \left(\frac{P_2}{P_1}\right)^{\frac{k+1}{k}}}$$

FIG.3

OPEN/CLOSE TIMING OF INTAKE VALVE AND OPENING OF EGR VALVE ARE CONSTANT $$f(\theta, P_1, P_2, T_1) = (1-\cos\theta)\,\frac{P_1}{\sqrt{T_1}}\sqrt{\left(\frac{P_2}{P_1}\right)^{\frac{2}{k}} - \left(\frac{P_2}{P_1}\right)^{\frac{k+1}{k}}}$$

FIG.4

CHOKE BY THROTTLE

CHOKE BY INTAKE VALVE

INTAKE-AIR MEASURING APPARATUS FOR INTERNAL COMBUSTION ENGINE

BACKGROUND OF THE INVENTION

For the purpose of increasing an efficiency of an internal combustion engine while reducing the concentration of harmful materials contained within exhaustion gas, it is necessary to measure a mass of intake-air sucked into the internal combustion engine, accurately, thereby controlling a mass of fuel injection, so that the air-fuel ratio can be kept at a target air-fuel ratio, which is determined by the operating condition thereof. Thus, the present invention relates to a technology for measuring a mass of air taken into the internal combustion engine, correctly.

Conventionally, as is described in Japanese Patent Laying-Open No. Hei 7-301144 (1995), for example, an apparatus for measuring a mass of air sucked into the internal combustion engine, comprises:

- a rotation speed detection means for detecting the rotation speed of a crank shaft;
- an intake pressure detection means for detecting the intake-air pressure within an intake manifold;
- a timing detection means for detecting the operation timing of a valve driving mechanism located at a side where the open/close timing thereof is adjusted by means of an open/close timing means of a variable intake valve;
- a charging efficiency calculation means for calculating a charging efficiency, i.e., a ratio between an actual weight of an intake-air introduced into a cylinder and a weight of an intake-air introduced into the cylinder under a predetermined condition of the atmosphere, or a correlation value thereof correlating to that charging efficiency, upon the basis of at least the rotation speed detected by said rotation speed detection means, the intake pressure detected by said intake pressure detection means and the operation timing detected by said timing detection means; and
- an intake-air mass calculation means for obtaining a mass of intake-air introduced into the cylinder, upon the basis of the charging efficiency or the correlation value thereof, which is calculated out by the charging efficiency calculation means, and also the intake-air pressure detected by the intake pressure detection means, thereby measuring the mass of intake-air introduced into the cylinder of the internal combustion engine.

In the conventional art mentioned above, however when calculating the charging efficiency upon the rotation speed, the intake-air pressure and the operation timing of the variable intake valve, i.e., the opening/closing timing thereof, a three-dimension (3D) map is used therein, having variables; such as, the rotation speed, the intake-air pressure and the operation timing of opening/closing the variable intake valve. For example, if trying to make up the map by dividing the variable region or domain of the operation timing for opening/closing the variable intake valve into ten (10) regions, respectively, then the map comes up to be 10×10×10×1,000 times large in memory size thereof; therefore, man-hour of collecting data through an actual machine comes to be massive, for making up that map, and also for a ROM for memorizing the map therein, it must be large in the memorizing capacity thereof. Accordingly, it rises up a manufacturing cost of such an engine controller apparatus (ECU).

BRIEF SUMMARY OP THE INVENTION

An object of the present invention, accordingly, is to provide an apparatus enabling to calculate out a mass of intake-air for an internal combustion engine, at high accuracy, but with using a map as small as possible in the memorizing capacity thereof.

Other object, according to the present invention, is to provide an apparatus enabling to calculate out a mass of intake-air for an internal combustion engine, at high accuracy and also with superior responsibility, but using a map as small as possible in the memorizing capacity thereof.

According to the present invention, for accomplishing the first object mentioned above, there is provided an intake-air measuring apparatus for an internal combustion engine, comprising:

- means for calculating an airflow passing through a throttle is valve, from an opening of said throttle valve, pressures in up/down streams of the throttle valve and temperature in downstream of the throttle valve;
- means for calculating an air mass passing through an intake valve, from an open/close timing of the intake valve, an opening of an EGR valve, and a rotation speed of the internal combustion engine; and
- a selection means for selecting either one of the air mass passing through the throttle valve or the air mass passing through the intake valve, depending upon operation condition of the internal combustion engine, thereby providing an output to be an air mass sucked into the internal combustion engine.

For accomplishing the second object mentioned above, according to the present invention, there is provided an intake-air measuring apparatus for an internal combustion engine, comprising:

- means for calculating an airflow passing through a throttle valve, from an opening of said throttle valve, pressures in up/down streams of the throttle valve and temperature in downstream of the throttle valve;
- a means for compensating a time when an air passing through the throttle valve reached to the intake valve;
- a means for calculating an air mass passing through the intake valve from the rotation speed of the internal combustion engine, an open/close timing of the intake valve and an opening of an EGR valve; and
- a means for selecting either one of the air mass passing through the throttle valve or the air mass passing through the intake valve depending upon an operation condition of the internal combustion engine.

Also, according to the present invention, for accomplishing the second object, as other means thereof, there is further provided an intake-air measuring apparatus for an internal combustion engine, comprising:

- a means for measuring a flow mass of an air in an upstream of a throttle valve;
- a means for compensating a time when the air passing through the throttle valve reaches to an intake valve;
- a means for calculating an air mass passing through the intake valve from a rotation speed of the internal combustion engine, an open/close timing of the intake valve and an opening of an EGR valve; and
- a means for selecting either one of the air mass passing through the throttle valve or the air mass passing through the intake valve, depending upon operation condition of the internal combustion engine, thereby providing an output to be an air mass sucked into the internal combustion engine.

Moreover, according to the present invention, also for accomplishing the second object, as further other means thereof, there is further provided an intake-air measuring apparatus for an internal combustion engine, comprising:

a means for measuring a flow mass of an air in an upstream of a throttle valve;

a means for compensating a time when the air passing through the throttle valve reaches to an intake valve; and a means for calculating an air mass passing through the intake valve from a rotation speed of the internal combustion engine, an open/close timing of the intake valve, and an opening of an EGR valve.

BRIEF DESCRIPTION OP THE SEVERAL VIEWS OF THE DRAWING

Those and other objects, features and advantages of the present invention will become more readily apparent from the following detailed description, when taken in conjunction with the accompanying drawings, wherein.

DETAILED DESCRIPTION OF THE INVENTION

Hereinafter, embodiments according to the present invention will be fully explained by referring to the attached drawings.

Figure 1:
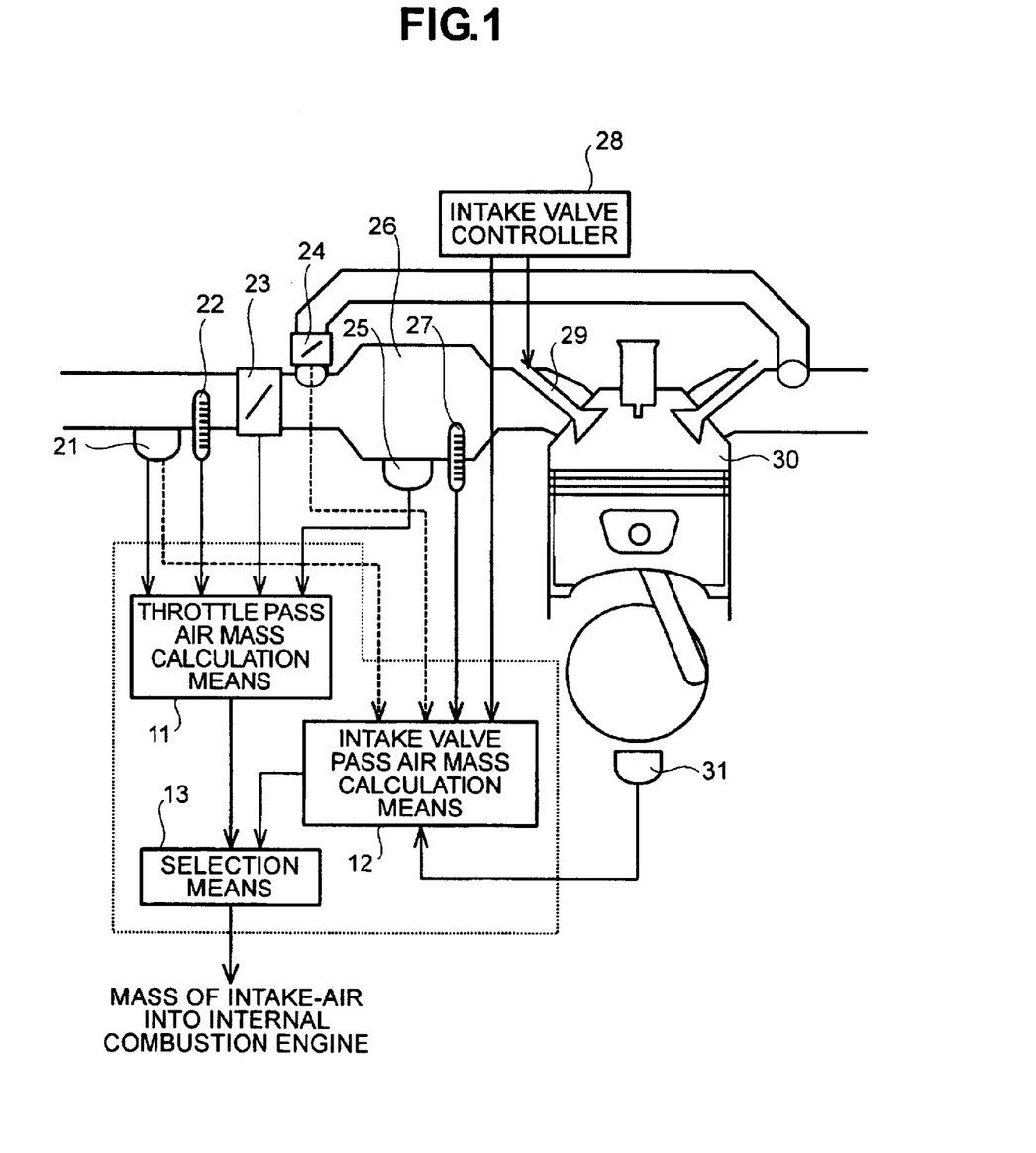
FIG. 1 is a view for explaining an embodiment of an intake-alr measuring apparatus for an internal combustion engine, according to the present invention.

A first embodiment according to the present invention will be explained by referring to FIG. 1 attached.

This first embodiment, according to the present invention, comprises:

a means 11 for calculating a mass of air passing through a throttle valve 23, from an opening of the throttle valve 23, pressures in up/down stream of the throttle valve 23, and temperature in the upstream of the throttle valve 23;

a means 12 for calculating a mass of air passing through an intake valve 29, from a rotating speed of an internal combustion engine, opening/closing timing of the intake valve 29 and an opening-degree of an EGR valve 24; and a means 13 for selecting either one of the air mass passing through the throttle valve or the air mass passing through the intake valve, depending upon an operation condition of the internal combustion engine, thereby outputting it, as a mass of intake-air sucked into the internal combustion engine.

In the internal combustion engine, an air and a fuel are taken into an inside of a cylinder and cause explosion therein, thereby obtaining a motive force therefrom. The ratio between the mass of air and the mass of fuel is controlled, so that it coincides with a target air-fuel ratio, which is given dependent upon the operation condition of the internal combustion engine. Measurement is made on the mass of the intake-air into the internal combustion engine, according to the present invention, and it is divided by the target air-fuel ratio; thereby, a mass of fuel injection is calculated out. And, the air-fuel ratio is controlled, so that it coincides with the target air-fuel ratio, by injecting the mass of fuel, which is calculated out.

Meaning of this structure will be explained by referring to FIGS. 2–4, hereinafter.

Figure 2:
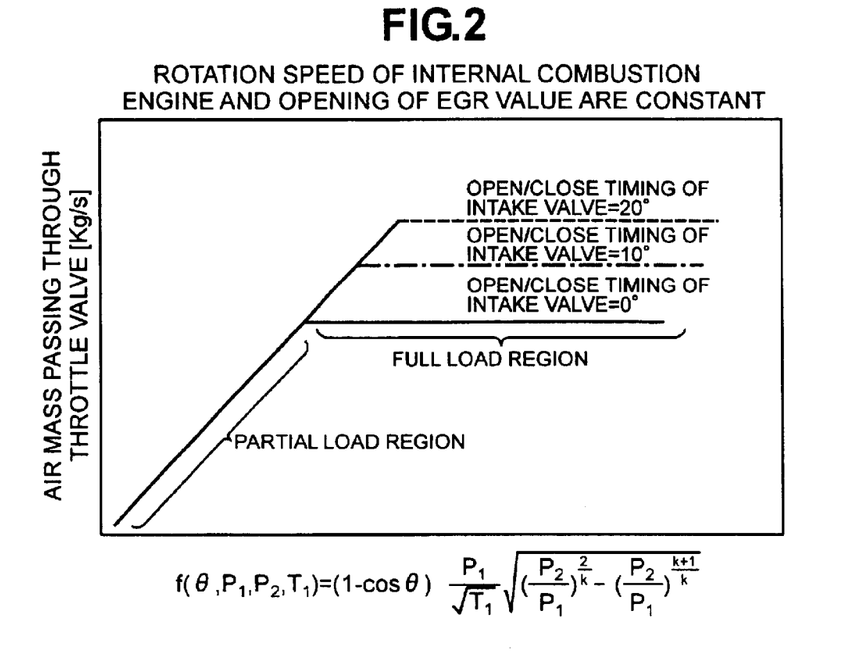
FIG. 2 is a view for showing an example of a characteristic curve of a mass of intake-air sucked into the internal combustion engine.

FIG. 2 shows a relationship between a function of an opening "θ" of the throttle valve 23, the pressures "P1" and "P2" in up/down streams of the throttle valve 23 and the temperature "T1" in the upstream of the throttle valve 23 (i.e., the following equation), and the mass of intake-air sucked into the internal combustion engine, when increasing the opening of the throttle valve 23 to be large:

$$f(\theta, P_1, P_2, T_1) = \frac{A_0(1-\cos\theta)}{\sqrt{RT_1}} \sqrt{\frac{2\gamma}{\gamma-1}\left\{\left(\frac{P_2}{P_1}\right)^{\frac{2}{\gamma}} - \left(\frac{P_2}{P_1}\right)^{\frac{\gamma+1}{\gamma}}\right\}} \quad (1)$$

where, "A0" is a cross-section area of the throttle valve;

"R" is a gas constant; and

"γ" is a ratio of specific heat for the air.

Study was made on this relationship at several opening/closing timings of the intake valve 29, while keeping the rotation speed of the internal combustion engine and the opening of the EGR valve 24 to be constant. Thus, it is apparent from FIG. 2 mentioned above, when the opening of the throttle valve 23 is smaller than a certain opening (i.e., in a region of partial load), the function f(θ, P1, P2, T1) and the mass of intake-air into the internal combustion engine are proportional to each other, and an inclination thereof is constant irrespective of the opening/closing timing of the intake valve 29; however, when the opening of the throttle valve 23 is larger than the certain opening (i.e., in a region of full load); then the mass of intake-air sucked into the internal combustion engine keeps a content value, which is determined by the opening/closing timing of the intake valve 29, irrespective of the function (θ, P1, P2, T1).

Figure 3:
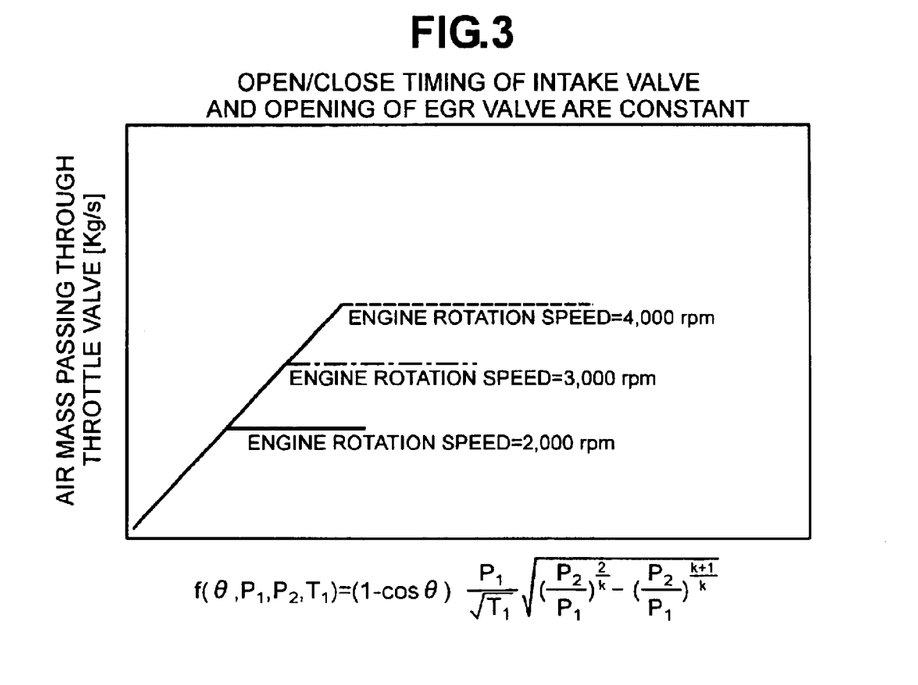
FIG. 3 is also a view for showing other example of the characteristic curves of a mass of intake-air sucked into the internal combustion engine.
Figure 4:
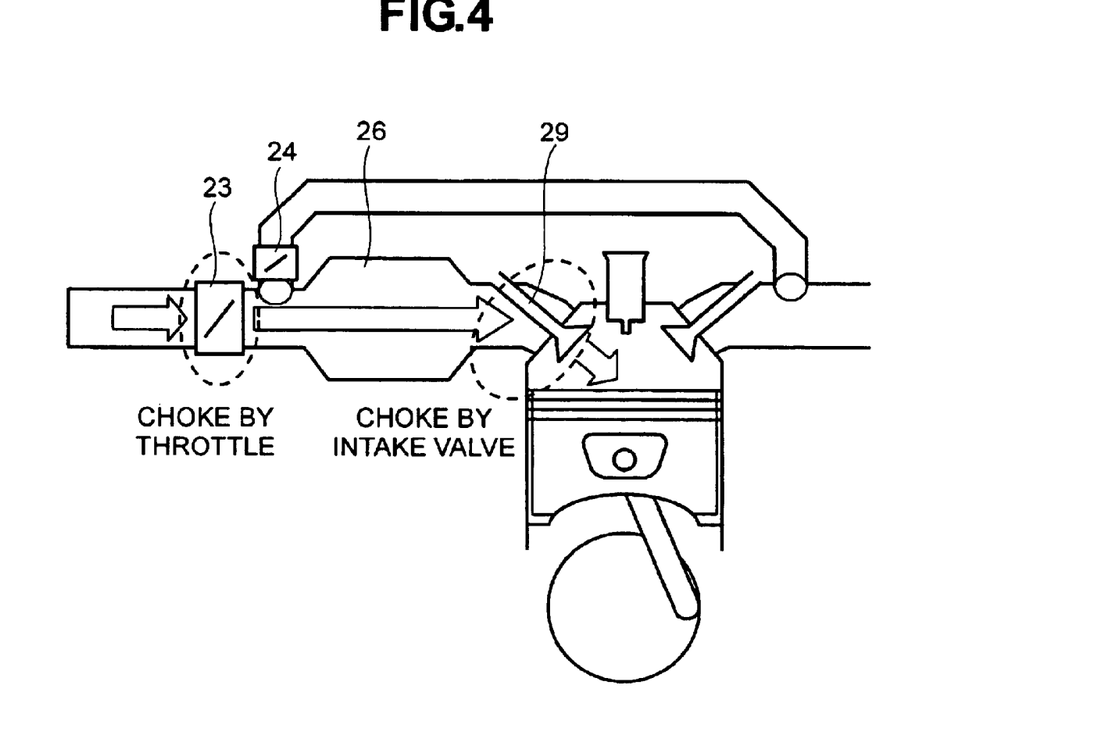
FIG. 4 is a view for explaining two (2) sets of valves for determining the mass of intake-air sucked into the internal combustion engine.

FIG. 3 also shows, in the similar manner to FIG. 2, the relationship between the function of the opening "θ" of the throttle valve 23, the pressures "P1" and "P2" in up/down streams of the throttle valve 23 and the temperature "T1" in upstream of the throttle valve 23 (i.e., the equation (1) mentioned above), and the mass of intake-air sucked into the internal combustion engine, when increasing the opening of the throttle valve 23 to be large. Then, study was made on this relationship at several rotation speeds of the internal combustion engine, while keeping the opening/closing timing of the intake valve 29 and the opening of the EGR valve 24 to be constant. It is apparent from FIG. 3 mentioned above, when the opening of the throttle valve 23 is smaller than a certain opening (i.e., in the region of partial load), the function f(θ, P1, P2, T1) and the mass of intake-air sucked into the internal combustion engine are proportional to each other, and an inclination thereof is constant irrespective of the rotating speed of the internal combustion engine; however, when the opening of the throttle valve 23 is larger than the certain opening (i.e., in the region of full load), then the mass of intake-air sucked into the internal combustion engine keeps a content value, which is determined by the rotating speed of the internal combustion engine, irrespective of the function f(θ, P1, P2, T1).

From those FIGS. 2 and 3, it is apparent that, when the internal combustion engine is operating under the partial load condition, a mass of intake-air sucked into the internal combustion engine can be calculated out, uniquely, to be a function of the opening "θ" of the throttle valve 23, the pressures "P1" and "P2" in the up/down streams of the throttle valve 23, and the temperature "T1" in the upstream of the throttle valve 23, irrespective of the rotation speed of the internal combustion engine, the opening/closing timing of the intake valve 29 and the opening of the EGR valve 24; while when it is operating under the full load condition, the mass of intake-air can be calculated out to be a function of the opening/closing timings of the intake valve 29 and the opening of the EGR valve 24. Accordingly, it is possible to obtain a mass of the air flowing into the internal combustion engine, if selecting a smaller one, between the flow mass when being under the partial load condition, which can be calculated out to be the function of the opening "θ" of the throttle valve 23, the pressures "P1" and "P2" in the up/downstreams of the throttle valve 23, and the flow mass under the full load condition, which can be determined by the rotation speed of the internal combustion engine, the opening/closing timing of the intake valve 29 and the opening of the EGR valve 24, after calculating both of them in advance.

The reason of this will be explained by referring to FIG. 4. On the process where the air is taken into the internal combustion engine, there are provided two (2) kinds of choking; i.e., the one by means of the throttle valve 23 and the other by means of the intake valve 29, as shown in FIG. 4. A mass of the intake-air into the internal combustion engine is restricted by the throttle valve when it is operating under the partial load condition; therefore, it can be calculated by the function f(θ, P1, P2, T1) of the opening "θ" of the throttle valve 23, the pressures "P1" and "P2" in the up/down streams of the throttle valve 23, and the temperature "T1" in the upstream of the throttle valve 23. While when it is operating under the full load condition, there is no such the influence of the choking by means of the throttle valve 23, then a mass of intake-air sucked into the internal combustion engine can be determined, as a function of the rotation speed of the internal combustion engine, the open/close timing of the intake valve 29 and the opening of the EGR valve. Accordingly, the mass of intake-air sucked into the combustion engine is coincident with the smaller one, between the mass of air passing through the throttle valve 23 and that passing through the intake valve 29.

Therefore, as the structure thereof was mentioned about in the beginning of the first embodiment, according to the present invention, the mass of intake-air into the internal combustion engine can be measured, by means of the intake-air measuring apparatus of the internal combustion engine, comprising:

a means 11 for calculating the air mass passing through the throttle valve 23 from the opening of the throttle valve 23, the pressures in the up/down streams of the throttle valve 23, and the temperature of the upstream of the throttle valve 23;

a means 12 for calculating the air mass passing through the intake valve 29 from the rotation speed of the internal combustion engine, the open/close timing of the intake valve 29 and the opening of the EGR valve 24; and a means 13 for selecting either one of the air mass passing through the throttle valve 23 depending upon the operation condition of the internal combustion engine or the air mass passing through the intake valve 29, thereby outputting it as the mass of intake-air into the internal combustion engine.

Also, according to the present embodiment, while applying different methods for the measurement within regions of the partial load condition and the full load condition; i.e., the mass of intake-air is calculated out from the physical equation within the region of the partial load condition, while using a map within the region of the full load condition. Thus, with the conventional method of conducting the calculation upon the mass of intake-air, all over the entire area of the load conditions, with an aid of a map, the mass of intake-air is calculated out from a four-dimension (4D) map of the rotation speed of the internal combustion engine, the open/close timing of the intake valve 29, the opening of the EGR valve 24, and also the pressure within the intake manifold; however, according to the present embodiment, the mass of intake-air can be calculated out from a three-dimension (3D) map of the rotation speed of the internal combustion engine, the open/close timing of the intake valve 29 and the opening of the EGR valve 24; thereby enabling to eliminate one (1) dimension from those of the map. This contributes to reduction of the processes for manufacturing the map, as well as, the ROM, into which the map is written, remarkably.

By the way, within the area of the full load condition, when calculating the mass of intake-air from the 3D map of the rotation speed of the internal combustion engine, the open/close timing of the intake valve 29 and the opening of the EGR valve 24, there is a other method for bringing the size of the 3D memory to be small.

Figure 5:
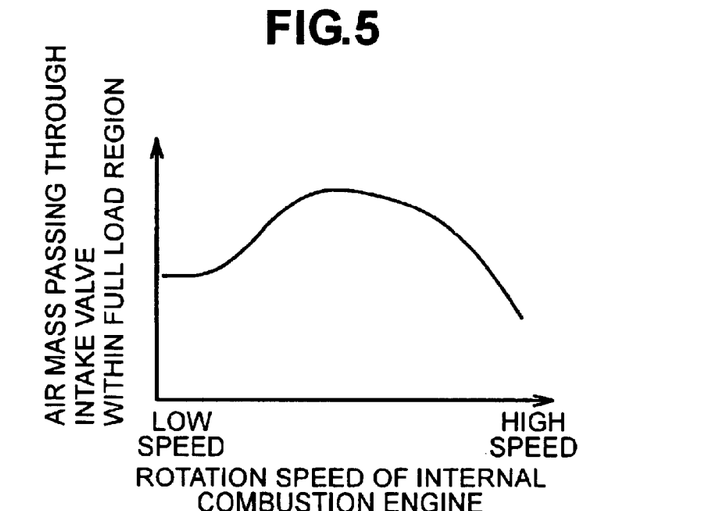
FIG. 5 is a view for showing an example of the characteristic curves of a mass of intake-air sucked into the internal combustion engine.

FIG. 5 is a view for showing a relationship between the rotation speed of the internal combustion engine and the air mass passing through the intake valve 29 when keeping the open/close timing of the intake valve 29 and the opening of the EGR valve to be constant. This view shows a necessity of dividing the variable regions or domains of the rotation speed of the internal combustion engine, finely (for example, dividing the region starting from 1,000 rpm to 6,000 rpm into ten (10) sections), so as to memorize the each air mass passing through the intake valve 29 into the ROM, respectively.

Figure 6:
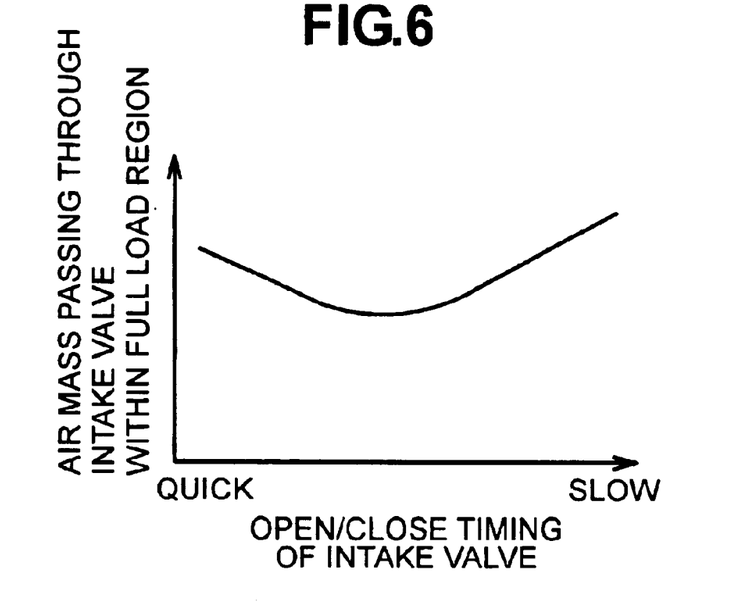
FIG. 6 is also a view for showing other example of the characteristic curve of a mass of intake-air sucked into the internal combustion engine.

FIG. 6 is a view for showing a relationship between the open/close timing of the intake valve 29 and the air mass passing through the intake valve 29, when the rotation speed of the internal combustion engine and the opening of the EGR valve 24 are made constant. This figure indicates that the air mass passing through the intake valve 29 can be approximated, to be a secondary function of the open/close timing of the intake valve 29. Accordingly, while memorizing the air mass passing through the intake valve 29 into the ROM, at both ends of the variable region of the open/close timing of the intake valve 29, as well as, in the vicinity of a center thereof, it is possible to obtain the air mass passing through the intake valve 29, with sufficient accuracy thereof, even in an a region between them, if making an interpolation between them, with using an appropriate function; such as, the secondary function or the like, for example.

Figure 7:
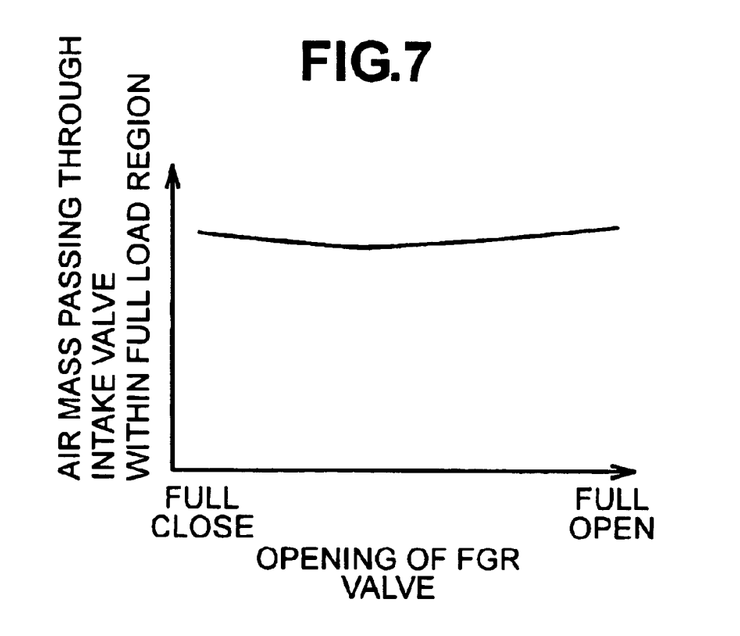
FIG. 7 is also a view for showing further other example of the characteristic curve of a mass of intake-air sucked into the internal combustion engine.

FIG. 7 is a view for showing a relationship between the opening of the EGR valve 24 and the air mass passing through the intake valve 29, when the rotation speed of the internal combustion engine and the open/close timing of the intake valve are made constant. This figure indicates that the air mass passing through the intake valve 29 can be approximated by a secondary function of the opening of the EGR valve 24, at the most. Accordingly, while memorizing the air mass passing through the intake valve 29 into the ROM, at both ends of the variable region of the opening of the EGR valve 24, as well as, in the vicinity thereof, it is possible to obtain the air mass passing through the intake valve 29, with sufficient accuracy thereof, even in the region between them, if making an interpolation between them with using an appropriate function; such as, the secondary function or the like, for example. Or, it is also possible, while memorizing the air mass passing through the intake valve 29 at the both ends of the variable region of the opening of the EGR valve 24, to obtain the air mass passing through the intake valve 29, with sufficient accuracy, if making the interpolation between them with using an appropriate function; such as, a primary function or the like, for example. Saying furthermore, since an ill influence is small, which the opening of the EGR valve 24 gives upon the air mass passing through the intake valve 29, therefore comparing to those by the rotation speed of the internal combustion engine and the opening of the EGR valve 24, therefore, it is possible to delete the ill influence of the opening of the EGR valve 24 from the map of the air mass passing through the intake valve 29; i.e., the mass of intake-air can be calculated from a two dimension (2D) map of the rotation speed of the internal combustion engine and the open/close timing of the intake valve 29.

Also, the influence is small, which the open/close timing of the intake valve 29 gives upon the mass of intake-air passing through the intake valve 29, comparing to those by the rotation speed of the internal combustion engine and the opening of the EGR valve 24 depending upon the internal combustion engine; therefore, it is possible to delete the influence of the open/close timing of the intake valve 29 from the map of the air mass passing through the intake valve 29; thereby, calculating from the 2D map of the rotation speed of the internal combustion engine and the opening of the EGR valve.

Therefore, in the first embodiment mentioned above, the means 12 for calculating the air mass passing through the intake valve 29 from the rotation speed of the internal combustion engine, the open/close timing of the intake valve 29 and the opening of the EGR valve 24, may comprises:

a map for calculating the air mass passing through the intake valve from the rotation speed of the internal combustion engine, the open/close timing of the intake valve 29 and the opening of the EGR valve 24, wherein that map is built up with a relationship between the rotation speed of the internal combustion engine and the air mass passing through the intake valve 29 in relation with three (3) of the open/close timings of the intake valve 29 and three (3) or two (2) of the opening of the EGR valve 24, and an interpolation may be made between them with applying an appropriate function.

Also, assuming that the influence is small upon the mass of intake-air by means of the opening of the EGR valve 24, in the first embodiment mentioned above, in the place of the means 12 for calculating the air mass passing through the intake valve 29 from the rotation speed of the internal combustion engine, the open/close timing of the intake valve 29 and the opening of the EGR valve 24, the following may be used;

a means 12 for calculating the air mass passing through the intake valve 29 from the rotation speed of the internal combustion engine and the open/close timing of the intake valve.

This means 11 for calculating the air mass passing through the intake valve 29 has a map for calculating the air mass passing through the intake valve 29 from the rotation speed of the internal combustion engine and the open/close timing of the intake valve 29, and that map may be constructed with a relationship between the rotation speed of the internal combustion engine and the air mass passing through the intake valve 29 in relation to three (3) of the open/close timings of the intake valve 29.

In the embodiment mentioned heretofore, it is assumed that the atmosphere (i.e., the pressure in the upstream of the throttle valve 23) "P1" is one (1) atmosphere, and that the pressure "P2" within the intake manifold when opening fully is equal to the atmosphere; i.e., 1 atmosphere, however, for example, when a car runs on a high mountain, there occur cases when the atmosphere is less than 1 atmosphere. In this instance, the pressure "P2" within the intake manifold when opening fully comes down to be lower than 1 atmosphere, and the air mass passing through the intake valve 29 decreases down as is lowered down. Accordingly, the means 12 for calculating the air mass passing through the intake valve 29 shown in FIG. 1 may calculate out the air mass passing through the intake valve 29, by add the pressure in the upstream of the throttle valve 23 in addition to the rotation speed of the internal combustion engine, the timing of the intake valve and the opening of the EGR valve 24.

Further, explanation will be given on the feature when the intake-air mass measuring apparatus for the internal combustion engine according to the present invention is practiced, along with the first embodiment as it is. Thus, sweeping the rotation speed of the internal combustion engine, the opening of the throttle valve 23, the open/close timing of the intake valve 29 and the opening of the EGR valve 24 enables achievement of various operation conditions. In each of the operation conditions, a spurious sensor signal is given to the intake-air mass measuring apparatus for the internal combustion engine. In this instance, if an output of the intake-air mass measuring apparatus of the internal combustion engine is changed due to the spurious signal, it means that the mass of intake-air is calculated by using that sensor signal. Thus, while watching the change of the output responding to the spurious signal, it is possible to make a study on that the mass of intake-air is calculated on which combination of the signals, for all of the operating conditions of the internal combustion engine. And, as a result of this, if it can be divided into the following two (2) operating conditions:

the operating condition of calculating the mass of intake-air from the opening of the throttle valve 23, the pressures in the up/down streams of the throttle valve 23 and the temperature in the upstream of the throttle valve 23; and the operating condition of calculating the air mass passing through the intake valve 29 from the rotation speed of the internal combustion engine, the open/close timing of the intake valve 29 and the opening of the EGR valve 24; then, it means that the first embodiment according to the present invention is carried out.

When calculating a mass of fuel injection within the internal combustion engine, the air mass entering into a cylinder 30 is used; i.e., the air mass passing through the intake valve 29. In the first embodiment, the air mass passing through the throttle valve 23 is acknowledged to be the mass of intake-air into the internal combustion engine, when operation under the partial load condition, while the air mass passing through the intake valve 29 when operating under the full load condition. Accordingly, when operating under the partial load condition, there is a necessity of making a compensation for the time delay from when the air passes through the throttle valve up to when it passes through the intake valve 29. A second embodiment according to the present invention is for compensating the time delay when the air passes through an intake manifold 26. Explanation will be made of the second embodiment according to the present invention, by referring to FIG. 8.

Figure 8:
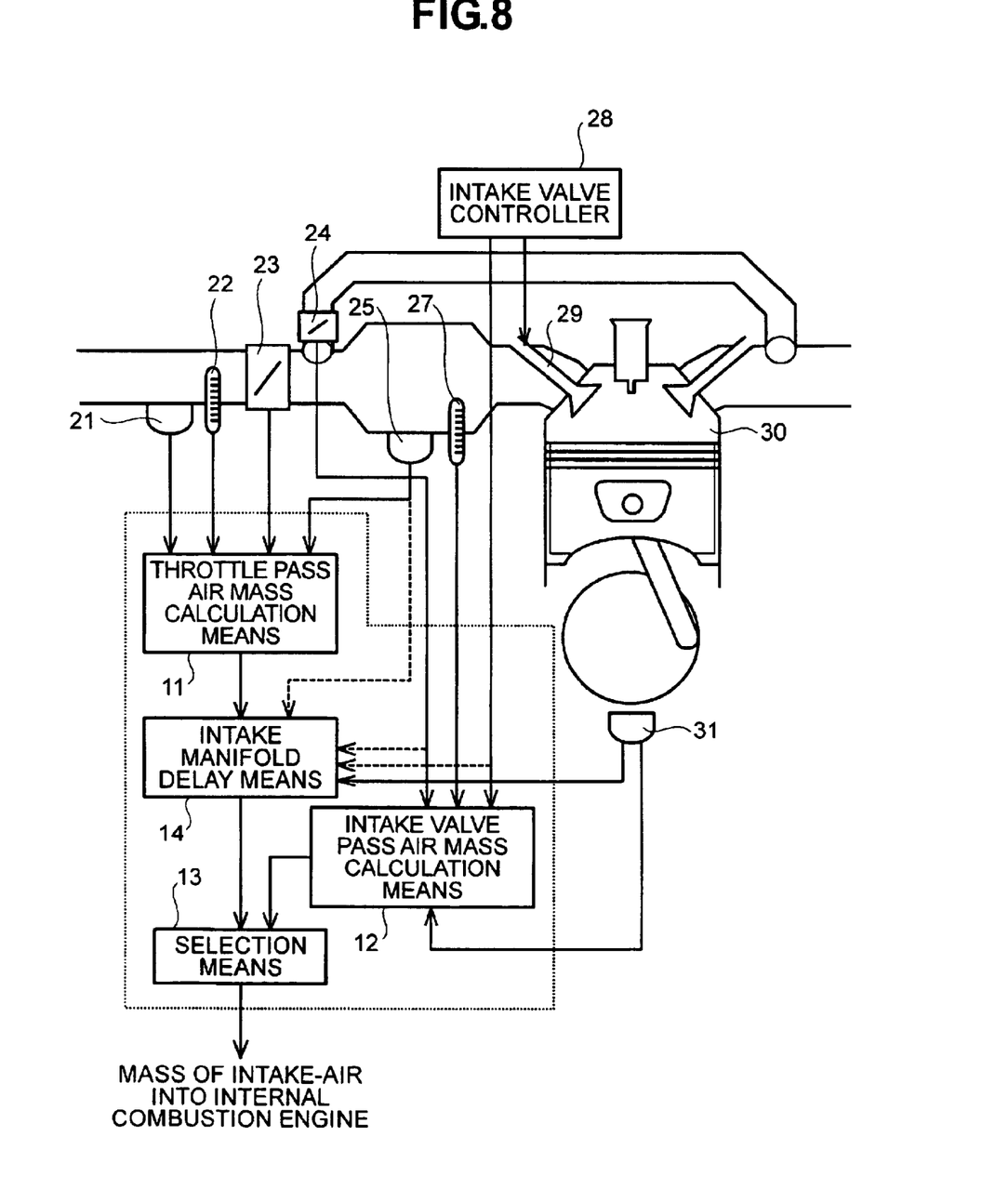
FIG. 8 is a view for showing other embodiment of the intake-air measuring apparatus for an internal combustion engine, according to the present invention.

The second embodiment according to the present invention is built up with:

a means 11 for calculating the air mass passing through the throttle valve 23 from the opening of the throttle valve, the pressures in the up/down stream of the throttle valve 23 and the temperature in the upstream of the throttle valve 23;

a means 14 for giving the delay within the intake manifold up to the time when the air passing through the throttle valve 23 reaches to the intake valve;

a means 12 for calculating the air mass passing through the intake valve from the rotation speed of the internal combustion engine, the open/close timing of the intake valve 29 and the opening of the EGR valve 24; and a means 13 for selecting either one of the air mass, which is obtained by applying the delay within the intake manifold onto the air mass passing through the throttle valve 23, or the air mass passing through the intake valve 29, depending upon the operation condition of the internal combustion engine, thereby outputting it as to be the mass of intake-air into the internal combustion engine.

Herein, assuming that:

Mth: an air mass passing through the throttle valve 23;

Mc: an air mass passing through the intake valve 29;

P2: pressure within the intake manifold:

T2: temperature within the intake manifold;

Vm: an inside volume of the intake manifold from the throttle valve 23 to the intake valve;

R: gaseous constant;

Vd: an internal volume of the cylinder; and

η: an intake efficiency; then, it is well-known that the relationship between the air mass "Mth" passing through the throttle valve 23 and the air mass "Mc" passing through the intake valve can be presented by the following equation (2):

$$M_{th} - M_c = \frac{V_m}{RT_s} \frac{dP_2}{dt} \qquad (2)$$

and also, the relationship between the air mass passing through the intake valve 29 and the pressure within the intake manifold can be presented by the following equation (3):

$$M_c = \frac{\eta n V_d P_2}{T} \qquad (3)$$

Deleting "P2" from those equations, the following equation (4) can be obtained:

$$M_{th} - M_c = \frac{V_m}{R\eta n V_d} \frac{dM_c}{dt} \qquad (4)$$

then, "Mc" can be approximated as a system of the primary delay of "Mth", and the time constant at that time is a function of the rotation speed of the internal combustion engine and the intake efficiency "η".

Figure 9:
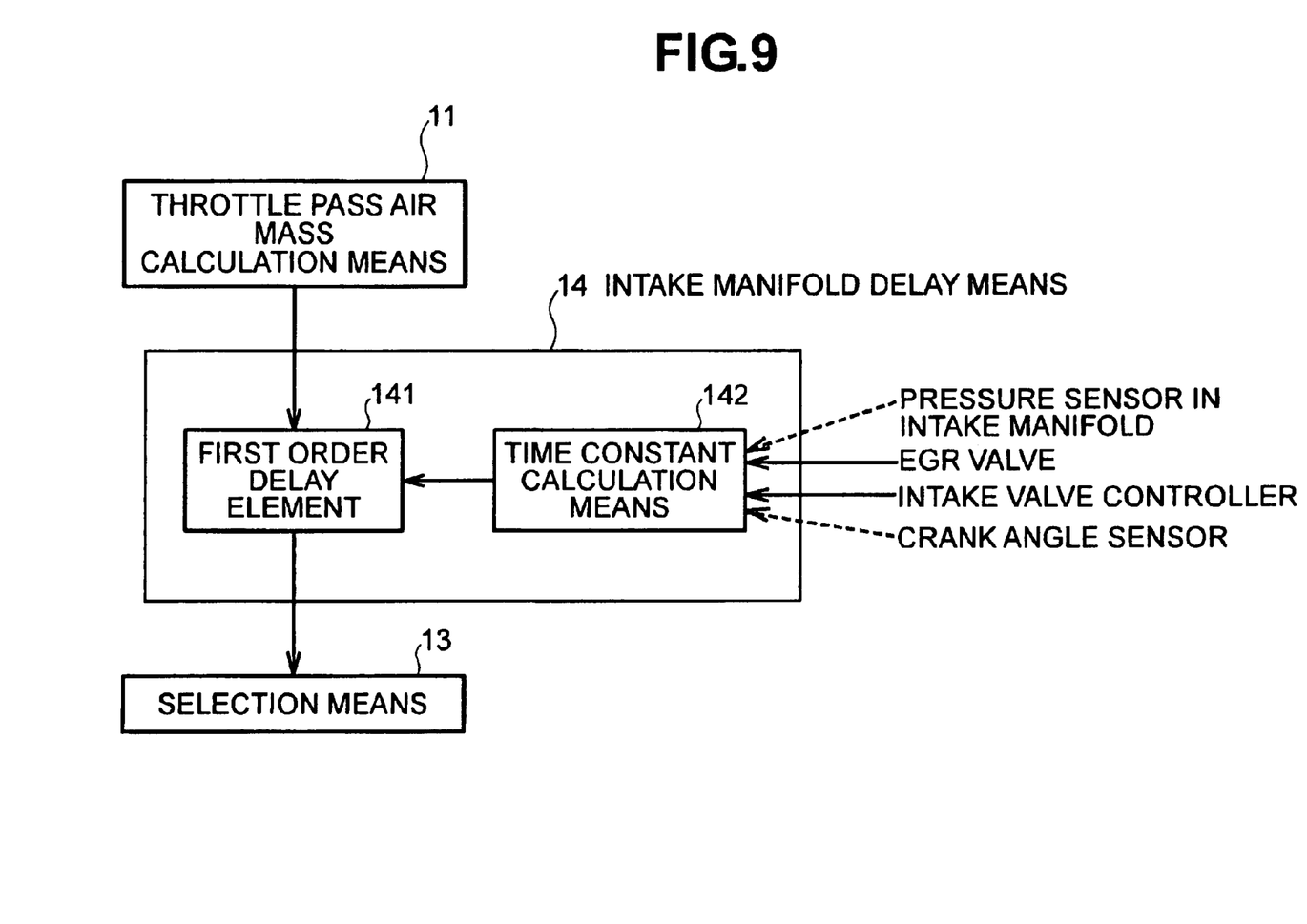
FIG. 9 is a view for showing an example of the structure of an intake manifold delay means of the intake-air measuring apparatus for an internal combustion engine, according to the present invention.
Figure 10:
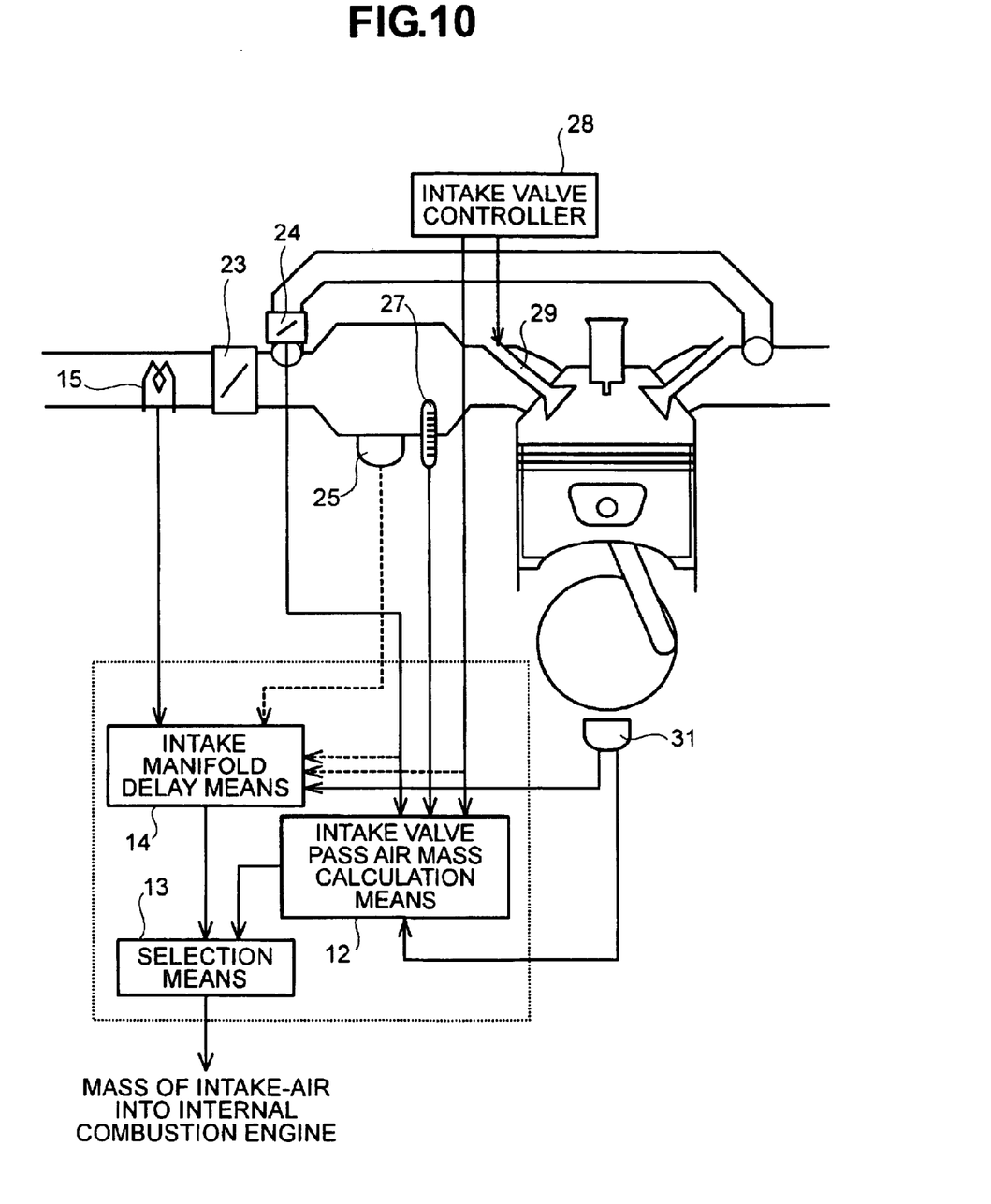
FIG. 10 is a view for showing other embodiment of the intake-air measuring apparatus for an internal combustion engine, according to the present invention.
Figure 11:
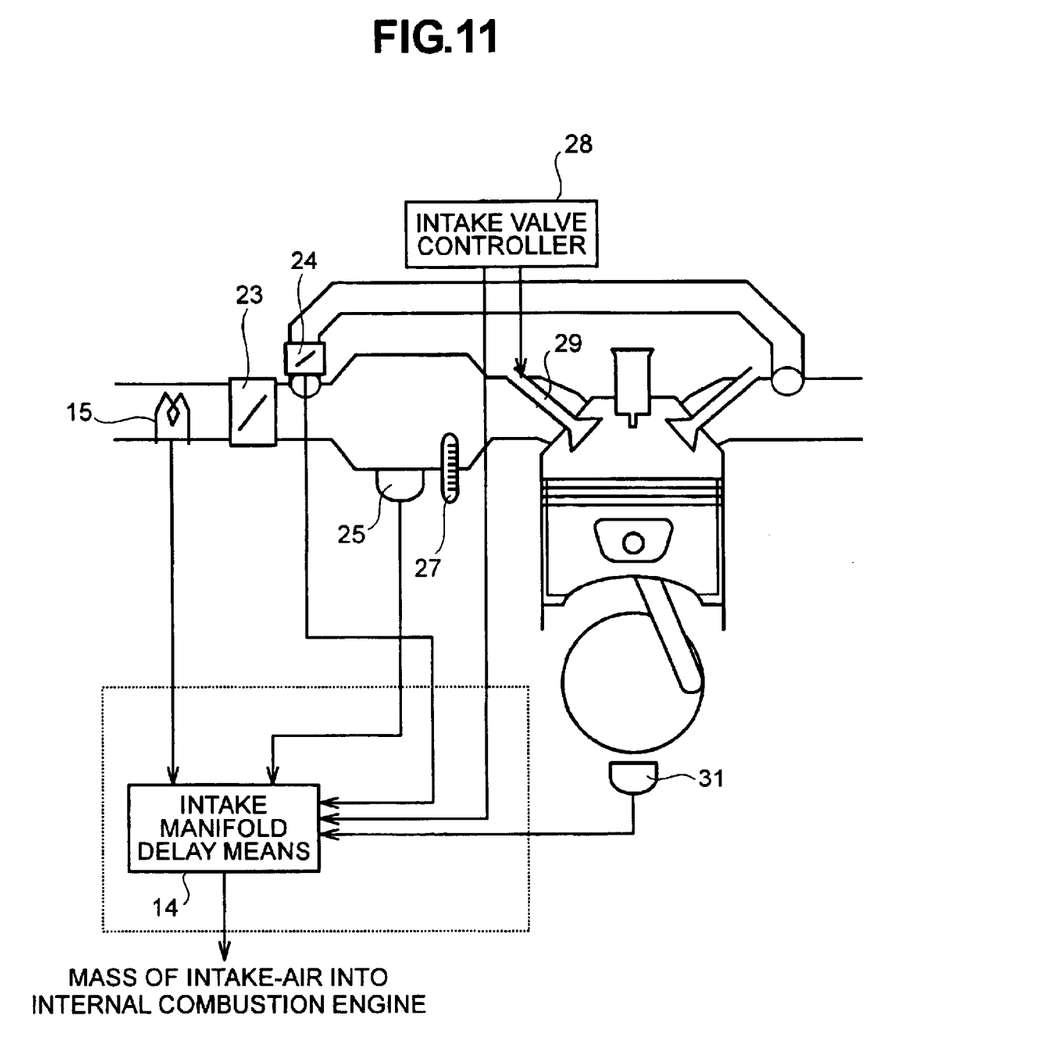
FIG. 11 is a view for showing further other embodiment of the intake-air measuring apparatus for an internal combustion engine, according to the present invention.

With measurement of the mass of intake-air during when the engine is in transition condition, it is not necessary to be so high as is required when measuring the mass of intake-air during the steady state, in the accuracy thereof; therefore it is possible to consider "η" to be a constant not depending upon the operation condition of the internal combustion engine. Then, it is possible to represent "Mc" by the primary delay system of "Mth", and the constant thereof to be depending only upon the rotation speed. Therefore, an example of the intake manifold delay means 14, according to the present second embodiment, comprises, as is shown in FIG. 9:

a means 142 for obtaining a time constant from the rotation speed of the internal combustion engine; and a primary delay element 141 of making this output to be the time constant thereof.

Also, if it is required to achieve the measurement of the mass of intake-air at high accuracy when being in the transition state, to be equal in the accuracy to that when being in the steady state, it is necessary to consider "η" to be a variable depending upon the operating condition of the internal combustion engine. Then, it is possible to represent "Mc" by the primary delay system of "Mth", and the time constant thereof to be the function of the rotation speed of the internal combustion engine, the timing of the intake valve 29, the opening of the EGR valve 24 and the pressure within the intake manifold. Therefore, another example of the intake manifold delay means, according to the second embodiment, can be constructed with, as shown in FIG. 9:

a means for obtaining the time constant from the rotation speed of the internal combustion engine, the timing of the intake valve 29, the opening of the EGR valve 24, and the pressure within the intake manifold; and a primary delay element 141 of making this output to be the time constant thereof.

In this manner, with the structure according to the second embodiment, namely, the intake-air mass measuring apparatus for the internal combustion engine, comprises:

a means 11 for calculating the air mass passing through the throttle valve 23 from the opening of the throttle valve 23, the pressures in the up/down streams of the throttle valve 23, and the temperature in the upstream of the throttle valve 23;

a means 14 for treating a delay up to the time when the air passing through the throttle valve 23 reaches to the intake valve 29;

a means 12 for calculating the air mass passing through the intake valve 29 from the rotation speed of the internal combustion engine, the open/close timing of the intake valve 29 and the opening of the RGR valve 24; and a means 13 for selecting either one of the air mass passing through the throttle valve 23 or the air mass passing through the intake valve 29, depending upon the operating condition of the internal combustion engine, thereby outputting it to be a mass of intake-air into the internal combustion engine; thus, it is possible to measure the mass of intake-air into the internal combustion engine, to be the air mass, but without the ill influences due to the time delay up to when the air reaches from the throttle valve 23 up to the intake valve 29.

Herein, when trying to consider the delay time up to when the air reaches from the throttle valve 23 to the intake valve 29 to be a primary delay system having a time constant depending upon the rotation speed, there is only a necessity of a matching; i.e., matching upon a proportion factor or coefficient between the rotation speed and the time constant, in addition to the matching, which is needed in the first embodiment; therefore, it can to said to be small in the number of steps for adaptation thereof. Also, when considering the delay when the air reaches from the throttle valve 23 to the intake valve 29 to be the primary delay system having the time constant depending upon the functions of the rotation speed of the internal combustion engine, the timing of the intake valve 29, the opening of the EGR valve 24 and the pressure within the intake manifold, there is a necessity of a matching; i.e., matching upon producing a map of the relationship between the rotation speed of the internal combustion engine, the timing of the intake valve 29, the opening of the EGR valve 24 and the pressure within the intake manifold and the time constants thereof, in addition to the matching, which is needed in the first embodiment. In this case, the number of the steps for adaptation comes to be large: however, the measuring accuracy of the intake-air can be improved up for it, when the engine is in the transition state.

It is known that the time constant of the primary delay system can be approximated to be a secondary function of the open/close timing of the intake valve 29, a primary or secondary function of the opening of the EGR valve 24, and/or a third function of pressure of intake manifold, with high accuracy. Then, the time constant calculation means memorizes therein the relationship between the rotation speed of the internal combustion engine and the air mass passing through the intake valve 29 in relation to three (3) of the open/close timing of the intake valve 29, two (2) or three (3) of the opening of the EGR valve 24 and four (4) of the pressure of the intake manifold, and then the time constant under the condition between them can be obtained through the interpolation thereof.

Among the structural elements of the second embodiment, it is possible to replace:

the means 11 for calculating the air mass passing through the throttle valve 23 from the opening of the throttle valve 23, the pressures in the up/down streams of the throttle valve 23 and the temperature in the upstream of the throttle valve 23, by a mass flow measuring means 15, such as, a heat-wire (or hot-wire) flow meter or the like. With doing this, the measurement of a mass of intake-air sucked into the internal combustion engine can be improved, in particular in the accuracy thereof, much more.

The relationship is shown in FIG. 2, between the output of the means 11 for calculating the air mass from the opening of the throttle valve 23, the pressures in the up/down streams of the throttle valve 23 and the temperature in the downstream of the throttle valve 24, and the mass of intake-air into the internal combustion engine, under the structure according to the first and second embodiments. Therein, when the output of the means 11 for calculating the air mass passing through the throttle valve 23 reaches to a certain value thereof, then the mass of intake-air into the internal combustion engine saturates. This is because there is no choking effect in the throttle valve 23 when the opening of the throttle valve 23 exceeds a certain angle thereof, therefore the mass of intake-air into the internal combustion engine saturates. However, irrespective of this saturation, the output of the means for calculating the air mass flowing through the throttle valve 23 comes to be large accompanying the opening of the throttle valve 23. On the other hand, in case substituting it with the mass flow measuring means 15, such as, the heat-wire (or hot-wire) flow meter or the like, the output of the mass flow measuring means 15 is proportional to the mass of intake-air sucked into the internal combustion engine, always. Accordingly, there is no necessity of selecting the smaller one, while calculating the air mass passing through the intake valve 29, in parallel. Therefore, in the case when using the mass flow measuring means 15, the intake-air measuring apparatus for the internal combustion engine may be made up with the mass flow measuring means 15, and the means 14 for treating the delay within the intake manifold up to when the air passing through the throttle valve 23 reaches to the intake valve 29, or it may be also such a one of outputting the air mass, which is obtained by treating the manifold delay on the air mass passing through the throttle valve 23, as the mass of intake-air.

On a while, it was assumed that the relationship between the air mass "Mth" passing through the throttle valve 23 and the air mass "Mc" passing through the intake valve 29 can be represented by the equation (4) mentioned above, being obtained from the equations (2) and (3), however the above equation (4) is established upon basis of a premise of the following equation (5):

$$\frac{dM_c}{dt} = \frac{\eta n V_d P_2}{T} \frac{dP_2}{dt} \tag{5}$$

However, when the rotation speed "n" of the engine or the intake efficiency "η" changes, abruptly, the equation (5) cannot be established. In that instance, from the equations (2) and (3), the following equation (6) can be obtained as the relationship between the air mass "Mth" passing through the throttle valve 23 and the pressure "P2" within the intake manifold:

$$M_{th} = \frac{\eta n V_d}{T_2}\left(P_2 + \frac{V_m}{\eta n V_d R} \frac{dP_2}{dt}\right) \tag{6}$$

This indicates that the pressure "P2" within the intake manifold can be approximated by the primary delay of the air mass "Mth" passing through the throttle valve, and also the time constant of that delay can be represented by the following equation (7):

$$\frac{V_m}{\eta n V_d R} \quad (7)$$

and, the gain can be represented by the following equation (8):

$$\frac{T_2}{\eta n V_d} \quad (8)$$

Then, the pressure "P2" of the intake manifold can be obtained from the primary delay, which can be represented by the equation (6), and "P2" is inputted into the equation (3); thereby, it is possible to obtain the air mass "Mc" passing through the intake valve 29.

Figure 12:
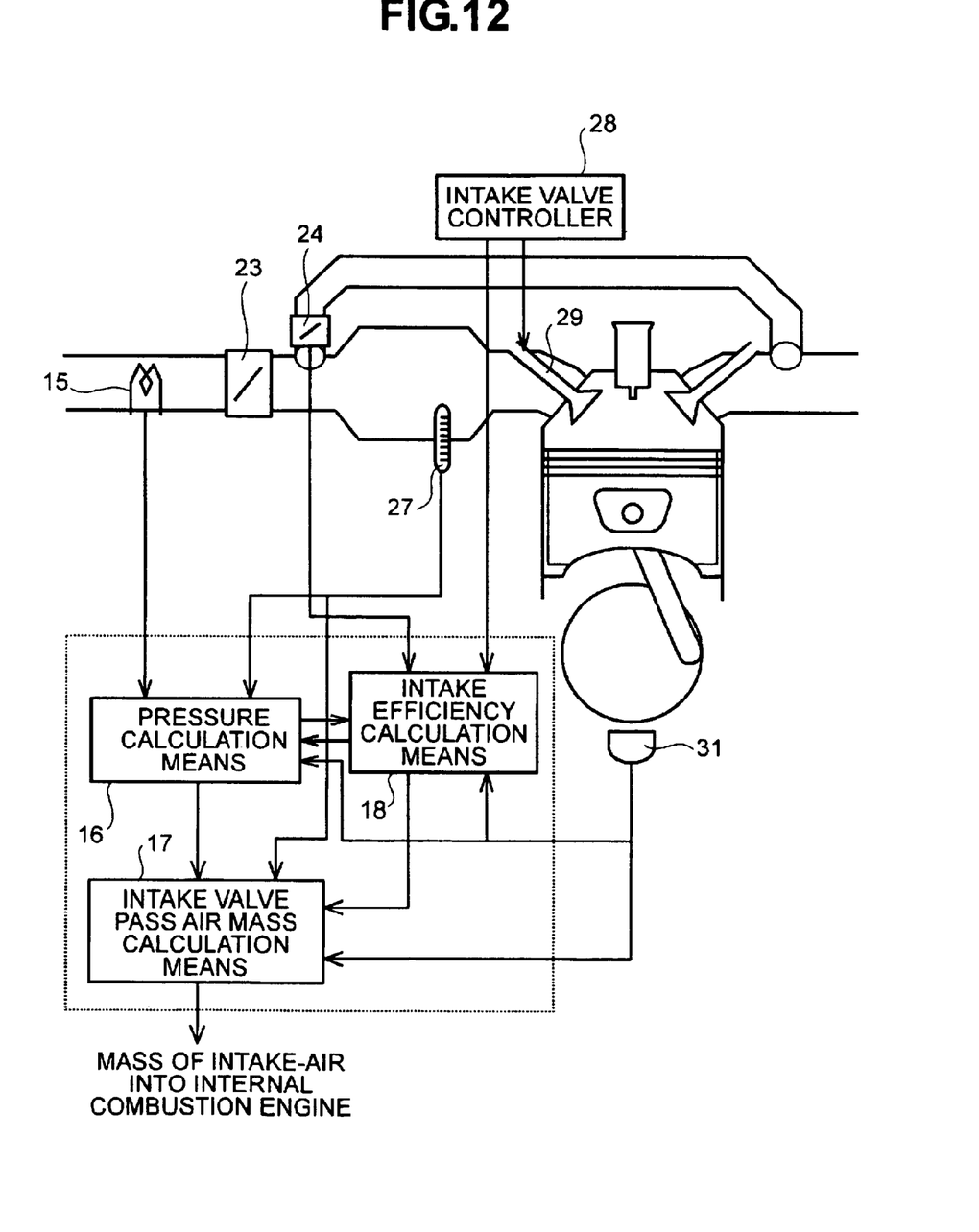
FIG. 12 is also a view for showing further other embodiment of the intake-air measuring apparatus for an internal combustion engine, according to the present invention.

From this, there can be also considered such an embodiment as is shown in FIG. 12 attached herewith. Thus, this embodiment comprises:

a means for calculating the intake efficiency from the pressure within the intake manifold, the timing of the intake valve 29, the opening of the EGR valve 24 and the rotation speed of the internal combustion engine;

a means 16 for calculating the pressure within the intake manifold from the air mass measured by the mass flow measuring means 15, the intake efficiency calculated out by the intake efficiency calculation means 18, the temperature of the intake manifold measured by the temperature detection sensor 27 and the rotation speed of the internal combustion engine; and an intake-valve passing air mass calculation means 17 for calculating the air mass passing through the intake valve from the intake efficiency calculated out by the intake efficiency calculation means 18, the pressure within the intake manifold calculated out by the pressure calculation means, the temperature within the intake manifold measured by the temperature sensor 27 and the oration speed of the internal combustion engine.

With the embodiment shown in FIG. 12, it is possible to calculate out the mass of intake-air passing through the intake valve, with quick response and high accuracy, even in the case where the rotation speed of the internal combustion engine and/or the intake efficiency change(s), abruptly.

Figure 13:
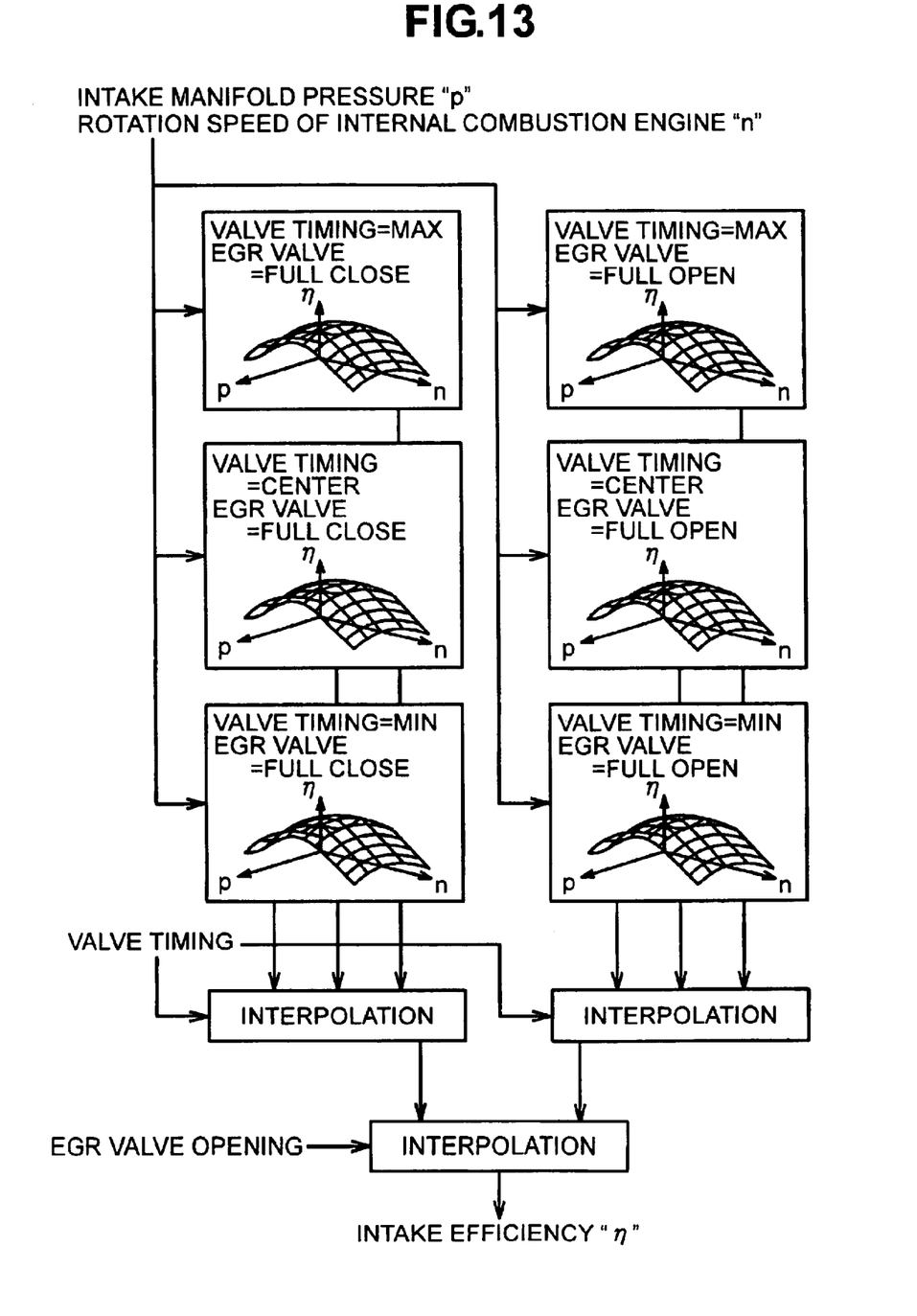
FIG. 13 is a view for showing an example of the structure of an air-intake ratio calculation means of the intake-air measuring apparatus for an internal combustion engine, according to the present invention.

Also, the intake efficiency calculation means 19 shown in FIG. 12 comprises, as is shown in FIG. 13, a map for obtaining the intake efficiency from the rotation speed of the internal combustion engine and the pressure of the intake manifold at three (3) points of the intake valve timing, two (2) points of the opening of the EGR valve, and when being supplied with the pressure within the intake manifold, the timing of the intake valve 29, the opening of the EGR valve and the rotation speed of the internal combustion engine, it calculates out the intake efficiency from the pressure within the intake manifold and the rotation speed of the internal combustion engine, in relation to each timing of the intake vale and each opening of the EGR valve, by referring to the map, thereby making the interpolations on the timing of intake valve and the opening of the EGR valve. In this FIG. 13, though the map is prepared for the intake efficiency at the two (2) points of the opening of the EGR valve, however, if preparing a map for the intake efficiency at three (3) points of the opening of the EGR valve, the accuracy of interpolation can be improved much more.

Within an engine having a swirl control valve therein, there may be provided such the intake efficiency calculation means as shown in FIG. 13, for each of when it is opened and closed, respectively, thereby selecting the intake efficiency depending upon the open/close condition of the swirl control valve.

As was fully explained in the above, according to the present invention, there can be provided an intake-air measuring apparatus for the internal combustion engine, enabling to calculate out the air mass passing through the intake valve from the opening of the throttle valve, the pressures in the up/down streams of the throttle valve and the temperature in the upstream of the throttle valve within the partial load area thereof, while from the rotation speed of the internal combustion engine, the open/close timing of the intake valve and the opening of the EGR valve within the full load area thereof; therefore, the matching is enough to be conducted only on the full load region, thereby contributing to deletion of capacity of the ROM, as well as, deletion of the number of steps for the matching.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. An intake-air measuring apparatus for an internal combustion engine, comprising:

a throttle valve pass air mass calculation means for calculating an airflow passing through a throttle valve, from an opening of said throttle valve, pressures in up/down streams of said throttle valve and temperature in downstream of said throttle valve;

an intake valve pass air mass calculation means for calculating an air mass passing through an intake valve, from an arbitrary combination of an open/close timing of said intake valve, an opening of an EGR valve, and a rotation speed of the internal combustion engine, where the combination includes at least the rotation speed of the internal combustion engine therein; and a selection means for selecting either one of the air mass calculated out by said throttle valve pass air mass calculation means or the air mass calculated by said intake valve pass air mass calculation means, on the basis of operation condition of the internal combustion engine, thereby outputting the selected air mass as the inducted air mass into the internal combustion engine.

2. The intake-air measuring apparatus for the internal combustion engine, as described in the claim 1, wherein said intake valve pass air mass calculation means calculates out an airflow mass from a map, which describes therein a relationship between the arbitrary combination of the open/close timing of said intake valve, the opening of an EGR valve, and the rotation speed of the internal combustion engine, where the combustion includes at least the rotation speed of the internal combustion engine therein, and an air mass passing through said intake valve.

3. The intake-air measuring apparatus for the internal combustion engine, as described in the claim 2, wherein said map describes a relationship between two (2) or three (3) openings of said EGR valve and the air masses passing through said intake valve at these openings.

4. The intake-air measuring apparatus for the internal combustion engine, as described in the claim 2, wherein said map describes a relationship between three (3) open/close timings of said intake valve and the air masses passing through said intake valve at these timings.

5. The intake-air measuring apparatus for the internal combustion engine, as described in the claim 1, wherein said intake valve pass air mass calculation means makes a compensation on intake air mass obtained from the rotation speed of the internal combustion engine, the open/close timing of the intake valve and the opening of the EGR valve, by the pressure of the upstream of the throttle valve.

6. The intake-air measuring apparatus for the internal combustion engine, as described in the claim 2, wherein said intake valve pass air mass calculation means makes a compensation on intake air mass obtained from the rotation speed of the internal combustion engine, the open/close timing of the intake valve and the opening of the EGR valve, by the pressure of the upstream of the throttle valve.

7. The intake-air measuring apparatus for the internal combustion engine, as described in the claim 3, wherein said intake valve pass air mass calculation means makes a compensation on intake air mass obtained from the rotation speed of the internal combustion engine, the open/close timing of the intake valve and the opening of the EGR valve, by the pressure of the upstream of the throttle valve.

8. The intake-air measuring apparatus for the internal combustion engine, as described in the claim 4, wherein said intake valve pass air mass calculation means makes a compensation on intake air mass obtained from the rotation speed of the internal combustion engine, the open/close timing of the intake valve and the opening of the EGR valve, by the pressure of the upstream of the throttle valve.

9. The intake-air measuring apparatus for the internal combustion engine, as described in the claim 1, further comprising:
  a manifold delay means for delaying the output of the throttle valve pass air mass calculation means for the time of the air to reach the intake valve from the throttle valve.

10. The intake-air measuring apparatus for the internal combustion engine, as described in the claim 2, further comprising:
  an intake manifold delay means for delaying the output of the throttle valve pass air mass calculation means for the time of the air to reach the intake valve from the throttle valve.

11. The intake-air measuring apparatus for the internal combustion engine, as described in the claim 3, further comprising:
  an intake manifold delay means for delaying the output of the throttle valve pass air mass calculation means for the time of the air to reach the intake valve from the throttle valve.

12. The intake-air measuring apparatus for the internal combustion engine, as described in the claim 4, further comprising:
  an intake manifold delay means for delaying the output of the throttle valve pass air mass calculation means for the time of the air to reach the intake valve from the throttle valve.

13. An intake-air measuring apparatus for the internal combustion engine, comprising:
  a mass flow measuring means for measuring an air mass passing through a throttle valve; and
  an intake manifold delay means for delaying the output of the throttle valve pass air mass calculation means for the time of the air to reach the intake valve from the throttle valve, which comprises:
  a time constant calculation means for obtaining a time constant from pressure in an intake manifold and an arbitrary combination of a rotation speed of the internal combustion engine, an open/close timing of said intake valve, and an opening of an EGR valve, where the combustion includes at least the rotation speed of the internal combustion engine therein, and
  a first order delay element of using an output of said time constant calculation means as its time constant thereof.

14. The intake-air measuring apparatus for the internal combustion engine, as described in the claim 13, wherein said time constant calculation means memorizes a relationship between the rotation speed of the internal combustion engine and the air mass passing through said intake valve, at three (3) points of the open/close timing of said intake valve, at two (2) or three (3) points of the opening of said EGR valve, and four (4) points of the pressure of said intake manifold, and obtains the time constant for a condition between these set point, by making an interpolation.

15. An intake-air measuring apparatus for the internal combustion engine, comprising:
  an intake efficiency calculation means for calculating an intake efficiency from pressure within an intake manifold, a timing of an intake valve, an opening of an EGR valve and a rotation speed of the engine; and
  an intake valve passing air mass calculation means for calculating an air mass passing through said intake valve, from an air mass passing through a throttle valve measured by a mass flow measuring means, an intake efficiency calculated out by said intake efficiency calculation means, temperature in the intake manifold measured by a temperature sensor and the rotation speed of the internal combustion engine, where said intake efficiency calculation means comprises:
  a map for obtaining the intake efficiency from the rotation speed of the internal combustion engine and the timing of the intake valve at three (3) timings of intake valve and two (2) or three (3) of openings of the EGR valve, where
  interpolation between the set point of the intake valve timing and the EGR valve opening is conducted to calculate the intake efficiency from the intake manifold pressure and the rotation speed of the internal combustion engine.

16. The intake-air measuring apparatus for the internal combustion engine, as described in the claim 15, wherein the internal combustion engine comprises a variable swirl control valve, while said the intake efficiency calculation means are prepared for a case where the swirl control valve is opened and a case where it is closed, respectively, and either one of said the intake efficiency calculation means is selected depending upon open/close condition of said swirl control valve.

* * * * *